UNITED STATES PATENT OFFICE 2,595,575

DYEABLE ACRYLONITRILE COPOLYMERS

George E. Ham, Dayton, Ohio, assignor, by mesne assignments, to The Chemstrand Corporation, a corporation of Delaware No Drawing. Application September 15, 1950, Serial No. 185,158

9 Claims. (Cl. 260—85.5)

This invention relates to new copolymers having unusual fiber forming properties. More specifically the invention relates to acrylonitrile copolymers capable of being converted into dyeable fibers. The invention also relates to dyeable copolymers which can be converted into useful general purpose fibers by conventional fiber spinning operations.

It is known that copolymers of in excess of 85 per cent acrylonitrile and up to 15 per cent of other monomers have excellent fiber forming properties. It is further known that by the proper selection of the comonomer, the copolymers and fibers prepared therefrom are made capable of reacting with acid dyestuffs, whereby useful colored products are obtainable. Most of the dyeable acrylonitrile polymers known to the published literature involve the use of comonomeric substances, which are costly and available only in limited quantities. Accordingly, dyeable fibers are prohibitively expensive and noncompetitive.

The primary purpose of this invention is to provide a method of preparing fibers of improved dye-receptivity. A further purpose is to provide methods of converting acrylonitrile copolymers into dye-receptive polymers by an efficient and economical procedure. A still further purpose is to provide new copolymers of acrylonitrile having unusual properties as are hereinafter described.

It has been found that new and useful copolymers can be obtained by the copolymerization of acrylonitrile with 1-allyloxy-3-chloro-2-propanol, 1 - allyloxy - 3 - bromo - 2 - propanol, 1-methallyloxy-3-chloro-2-propanol, 1-methallyloxy-3-bromo-2-propanol, or 1-chloroallyloxy-3-chloro-2-propanol. Useful copolymers are those of 80 per cent to 99 per cent of acrylonitrile and from one to 20 per cent of the substituted propanol. Preferred compositions are those of 90 to 98 per cent acrylonitrile and from two to ten percent of the comonomer. Preferred copolymers are those of as high as possible acrylonitrile content and yet having sufficient comonomer to be rendered dye-receptive.

In addition to the acrylonitrile and 1-allyloxy-3-chloro-2-propanol (or methallyl or chloroallyl derivatives) the copolymers may include small proportions of other monomers interpolymerized therewith, for example vinyl acetate, vinyl chloride, styrene, methacrylonitrile, vinylpyridine, methyl methacylate, and diethyl maleate. The quantity of the comonomer present in polymerized form in the acrylonitrile polymer must necessarily be small, since at least 80 per cent of acrylonitrile is required to produce fibers with desirable tensile properties, and since at least two per cent of the allyloxy derivative is required. Accordingly, copolymers of up to 18 per cent of the comonomer, or mixtures of comonomers, are useful.

The new copolymers of acrylonitrile, and especially those of the 1-allyloxy-3-chloro-2-propanol, may be prepared by any polymerization procedure, but the preferred practice utilizes a modified aqueous emulsion polymerization, whereby finely divided solid polymers capable of use directly in fiber operations are obtained. The emulsion polymerization procedure may utilize batch methods, wherein the monomers are charged to a reaction vessel with an aqueous medium containing the necessary catalyst and dispersing agents. However, the preferred procedure involves a semi-continuous procedure, in which a mixture of monomer is charged to an aqueous medium maintained under conditions necessary to effect polymerization. Obviously, entirely continuous procedures may also be used in which the monomers are gradually introduced to the reactor and the copolymers removed continuously.

The polymerization is catalyzed by means of any water-soluble peroxy compound, for example sodium peroxide, hydrogen peroxide, potassium persulfate, sodium percarbonate, sodium perborate, and the alkali metal and ammonium salts of the same, and other peroxy acids, and any other water-soluble compound containing a peroxy group (—O—O—). A wide variation in the quantity of peroxy compound is possible. For example, from 0.1 to 3.0 per cent by weight of the polymerizable monomer may be used. The catalyst may be charged at the outset of the reaction, or it may be added continuously, or in increments, throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using wetting agents, or emulsion stabilizers. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amine soaps," such as salts of triethanolamine and dodecylmethylamine, salts of rosin acids and mixtures thereof, the water-soluble salts of half esters of sulfuric acid and long chain aliphatic alcohols, sulfonated hydrocarbons, such as alkylaryl sulfonates, and any other of the wide variety of wetting agents, which are in general organic compounds containing both hydrophobic and hydrophilic radicals. The quantity of emulsifying agent will depend upon the particular agent selected, the ratio of monomer to water being used, and the conditions of polymerization. In general, however, from 0.01 to one per cent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally rotary stirring devices are the most effective means of insuring the intimate contact of the reagents, but other means may be successfully employed, for example by rocking or tumbling the reactors. The polymerization equipment generally used is conventional in the art, and the adaptation of a particular type of apparatus to the reaction contemplated is within the province of one skilled in the art.

The optimum polymerization conditions for fiber formation involve the use of polymerization regulators to prevent the formation of polymers of excessive molecular weight. Suitable regulators are the alkyl and aryl mercaptans, carbon tetrachloride, chloroform, dithioglycidol and alcohols. The regulators may be used in amounts varying from 0.001 to two per cent on the weight of the monomer to be polymerized.

When the polymerization is complete the polymer is separated from the aqueous medium by any of the conventionally used methods. When the optimum procedures above described are used, the polymer may be separated from the aqueous phase by filtration. The resulting polymer in either case may require washing operations to remove traces of soluble catalyst or dispersing agent.

The solid granular copolymers of acrylonitrile and the 1-allyloxy-3-chloro-2-propanol or the methallyl or chloroallyl analogues are useful in the preparation of fibers by convention methods. The preferred practice involves the preparation of spinning solutions by dispersing the polymer in suitable solvents, for example N,N-dimethylacetamide, N,N-dimethylformamide, gamma-butyrolactone and ethylene carbonate. The polymer solutions are fabricated into fibers by extrusion through a suitable die or a spinneret containing a plurality of minute apertures into a medium which removes the solvent and causes the polymer to precipitate into a continuous linear form. The said medium may be liquid, for example water, or aqueous solutions of acids, bases or salts, or it may be a gaseous medium, for example air or any gas which is inert with respect to the polymer.

The new acrylonitrile copolymers must be converted by chemical reaction into a form which is dye-receptive. The nature of the reaction will depend to some extent upon the physical form of the polymer. In general the allyloxy (methallyloxy or chloroallyloxy) -3-chloro-2-propanol grouping must be converted into a tertiary amine, for example by reaction first with ammonia or an amine containing at least one active hydrogen. It is then preferable to treat this product with an aliphatic halide or an alkyl ester of an acid having an ionization constant greater than $10^{-4}$ to produce a quaternary ammonium salt.

If the polymer is not in the form in which it will be used, fiber or film, care must be taken to avoid cross-linking of the polymer or gelation of the polymer solution. Solid polymer, which must be dissolved in suitable solvents for fabrication into fiber or film, should be reacted with secondary amines in the first stage of the reaction, since both ammonia and primary amines will render the polymer substantially insoluble in many of the conventional solvents. The conversion of the resulting tertiary amine containing polymer to a quaternary ammonium salt is effected in the above described manner by reaction with an aliphatic halide or an ester of a strong organic acid.

Preformed fibers of a copolymer of acrylonitrile and the 1-allyloxy-3-chloro-2-propanol (or the corresponding methallyloxy and chloroallyloxy derivatives) are not subject to the disability due to danger of cross-linking or gelation. The details of the process of converting the non-dyeable polymer to a dye-receptive form will be described with respect to this more general aspect of the invention.

In order to convert the fibers into a dye-receptive form they may first be treated with primary amines, secondary amines, or ammonia. To develop optimum dyeability the fibers are then treated with an agent suitable for converting the amino derivative into a quaternary ammonium salt. Suitable amines for effecting the first stage of the reaction are amines which contain at least one active hydrogen. Thus, primary amines, such as methylamine, n-butylamine, cyclohexylamine; or secondary amines, such as dimethylamine, diethylamine, dibutylamine, and N-methylcyclohexylamine are suitable. The amine or ammonia derivatives are thereafter reacted with agents suitable for converting the nitrogen into a quaternary ammonium salt form, the quantity required depending upon the number of replaceable hydrogens contained in the basic copolymer. For this reaction reagents, such as chloroacetic acid, methyl chloroacetate, methyl toluenesulfonate, dimethyl sulfate, n-butyl bromide, may be used. In general, the quaternizing agents may be aliphatic compounds containing halogen substituents or they may be esters of acids having ionization constants in excess of $10^{-4}$. Similarly other agents for converting aliphatic nitrogen atoms into quaternary salts may be used.

A preferred fiber preparation method involves the dispersion of the untreated copolymer in a suitable solvent, for example N,N-dimethylacetamide, N,N-dimethylformamide, ethylene carbonate and butyrolactone, and thereafter treating the spinning solution with amines and quaternizing agents. As above described the use of secondary amines is usually required, because the presence of ammonia and primary amines often induces the gelation of the spinning solution.

A further procedure for fiber preparation involves the preliminary preparation of amine-treated fibers and dyeing them in conventional dye baths to which the quaternizing agents have been added. By this procedure the amine treatment may be executed on the solid polymer, in the spinning solution, or on the spun fibers.

The reaction by which the 1-allyloxy-3-chloro-2-propanol copolymer is converted into a dyeable composition by treatment with first a secondary amine and then with an alkyl halide is believed to be as follows:

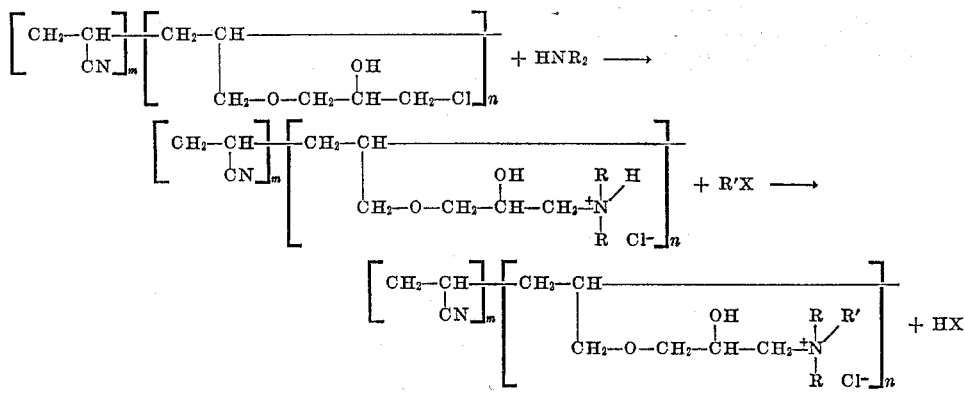

The copolymers modified by reaction in accordance with the preceding equation are capable of undergoing anionic exchange with acid dyestuffs.

Further details of the invention are set forth with respect to the following examples:

Example 1

A glass reaction flask provided with a reflux condenser and a stirring mechanism was charged with four parts by weight of water containing 0.03 per cent of the sodium salt of mahogany acids. Over a two hour period at 70° C. one part by weight of mixed monomers containing 88 per cent of acrylonitrile and 12 per cent of 1-allyloxy-3-chloro-2-propanol was added gradually to the mixture. During the addition the reaction was catalyzed by adding one per cent of the weight of the monomers of potassium persulfate as a dilute solution in periodic increments. After the reaction was completed the reaction mixture was steam-distilled to remove unreacted monomers and then separated by filtration and drying. A yield of 92.6 per cent of a copolymer of acrylonitrile and 1-allyloxy-3-chloro-2-propanol was obtained. An analysis showed that the product contained 90.3 per cent of acrylonitrile and 9.7 per cent of 1-allyloxy-3-chloro-2-propanol.

The new copolymer was dissolved to the extent of 25 per cent in N,N-dimethylacetamide and then dimethylamine (nine per cent solution in dimethylacetamide) was added in the amount of two molecular equivalents based on the interpolymerizable allyloxychloropropanol. The mixing was continued for four and one half hours at 70° C. The treated solution was then spun through a spinneret containing 30 apertures each 0.005 inch in diameter into a solution of 60 per cent N,N-dimethylacetamide and 40 per cent water. The fiber so obtained was stretched to the extent of 264 per cent and then shrunk by passing the fiber through a steam atmosphere at 45 pounds per square inch gauge. The fiber was then immersed in a dye bath containing two per cent of Wool Fast Scarlet, ten per cent of sulfuric acid, and 41 mls. of water for each gram of fiber treated. The dyeing was conducted for one hour at 100° C. Good dyeability of the fiber occurred. The addition of a quantity of chloroacetic acid equal to the fiber weight to the dye bath produced a deep scarlet shade on the fiber.

Example 2

Using the procedure described in the preceding example 368 parts by weight of acrylonitrile and 32 parts of 1-allyloxy-3-chloro-2-propanol were copolymerized in the presence of 680 parts of water at 70° C. A solution of three parts of potassium persulfate in 120 grams of water was added during the reaction. The resulting copolymer was found to contain 6.6 per cent by weight of the 1-allyloxy-3-chloro-2-propanol.

Fifteen parts by weight of this copolymer and 85 parts of N,N-dimethylacetamide were spun and stretched according to the procedure described in the preceding example. The fiber so obtained had a tenacity of 3.8 g/d, 7.7 percent elongation and 7.9 percent of boil shrinkage. The resulting fibers were not dyeable with Wool Fast Scarlet. Fibers prepared by the identical method which were spun from a spinning dope which was treated with a stoichiometric quantity of dimethylamine (based on the 1-allyloxy-3-chloro-2-propanol) for 18 hours at 70° C. were found to dye well with Wool Fast Scarlet dye by the standard dyeing procedure described in the preceding example.

Example 3

The procedure described in the preceding experiment was repeated except that one part of a 92 percent acrylonitrile-eight percent 1-allyloxy-3-chloro-2-propanol mixture, four parts of water, 0.01 part potassium persulfate, and 0.01 part sodium formaldehyde-naphthalene sulfonate was used in the preparation. When treated with dimethylamine in N,N-dimethylacetamide solution prior to spinning, fibers were prepared capable of being dyed with a Wool Fast Scarlet dye bath. Similar fibers which were not treated with the dimethylamine were not found to be dyeable.

What I claim is:

1. A copolymer of from 80 percent to 99 percent by weight acrylonitrile and from one percent to 20 percent of a compound having the structural formula:

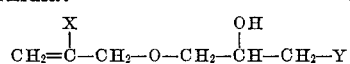

wherein X is a radical of the group consisting of hydrogen, chlorine and methyl, and Y is a halogen atom of the group consisting of chlorine and bromine.

2. A copolymer of 80 percent to 99 percent by weight of acrylonitrile and from one to 20 percent of 1-allyloxy-3-chloro-2-propanol.

3. A fiber of a copolymer of 90 percent to 98 percent by weight of acrylonitrile and from 2 to 10 percent of 1-allyloxy-3-chloro-2-propanol.

4. A copolymer of 80 percent to 99 percent by weight of acrylonitrile and from 1 to 20 percent of 1-methallyloxy-3-chloro-2-propanol.

5. A fiber of a copolymer of 90 percent to 98 percent by weight of acrylonitrile and from 2 to 10 percent of 1-methallyloxy-3-chloro-2-propanol.

6. A copolymer of 80 percent to 99 percent by weight of acrylonitrile and from 1 to 20 percent of 1-chloroallyloxy-3-chloro-2-propanol.

7. A fiber of a copolymer of 90 percent to 98 percent by weight of acrylonitrile and from 2 to 10 percent of 1-chloroallyloxy-3-chloro-2-propanol.

8. The copolymer obtained by reacting the product of claim 1 with a compound of the group consisting of ammonia and amines having at least one hydrogen atom.

9. The copolymer obtained by converting the product of claim 8 into a quaternary ammonium compound.

GEORGE E. HAM.

No references cited.